US010865325B2

(12) United States Patent
Nakao

(10) Patent No.: US 10,865,325 B2
(45) Date of Patent: Dec. 15, 2020

(54) THERMALLY CURABLE COMPOSITION, VARNISH THEREOF, AND THERMALLY CURED OBJECT

(71) Applicant: JFE Chemical Corporation, Tokyo (JP)

(72) Inventor: Hiroaki Nakao, Tokyo (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 76 days.

(21) Appl. No.: 16/320,187

(22) PCT Filed: Jun. 20, 2017

(86) PCT No.: PCT/JP2017/022681
§ 371 (c)(1),
(2) Date: Jan. 24, 2019

(87) PCT Pub. No.: WO2018/020909
PCT Pub. Date: Feb. 1, 2018

(65) Prior Publication Data
US 2019/0270907 A1  Sep. 5, 2019

(30) Foreign Application Priority Data

Jul. 26, 2016  (JP) ................................ 2016-146071

(51) Int. Cl.
C09D 161/34 (2006.01)
C09D 7/20 (2018.01)
C08G 14/06 (2006.01)
C09D 7/63 (2018.01)

(52) U.S. Cl.
CPC ............ *C09D 161/34* (2013.01); *C08G 14/06* (2013.01); *C09D 7/20* (2018.01); *C09D 7/63* (2018.01)

(58) Field of Classification Search
CPC ......... C09D 161/34; C09D 7/20; C08G 14/06
See application file for complete search history.

(56) References Cited

U.S. PATENT DOCUMENTS

| 4,501,864 A | 2/1985 | Higginbottom |
| 4,507,428 A | 3/1985 | Higginbottom et al. |
| 6,114,494 A * | 9/2000 | Kifer .................. C08G 73/1042 428/375 |
| 2003/0023007 A1* | 1/2003 | Reardon .............. C07D 265/26 525/430 |
| 2010/0196782 A1 | 8/2010 | Izuhara et al. |
| 2011/0224370 A1 | 9/2011 | Kanda et al. |
| 2013/0217820 A1 | 8/2013 | Nakao et al. |
| 2015/0141583 A1 | 5/2015 | Arai et al. |

FOREIGN PATENT DOCUMENTS

| GB | 1437814 | 6/1976 |
| JP | 4947378 A | 5/1974 |
| JP | 60155234 A | 8/1985 |
| JP | 60177074 A | 9/1985 |
| JP | 11228786 A1 | 8/1999 |
| JP | 2015079762 A | 4/2015 |
| JP | 2015522092 A | 8/2015 |
| WO | 2010032719 A1 | 3/2010 |
| WO | 2011125665 A1 | 10/2011 |
| WO | 2012057298 A1 | 5/2012 |

OTHER PUBLICATIONS

International Search Report and Written Opinion for International Application No. PCT/JP2017/022681, dated Aug. 15, 2017—6 pages.
Ogura et al., "Novel High-Performance Crystalline Epoxy Resin Used for Semiconductor Molding Component" with partial translation, DIC Technical Review, 1999, No. 5, pp. 21-30.

* cited by examiner

*Primary Examiner* — Robert D Harlan
(74) *Attorney, Agent, or Firm* — RatnerPrestia

(57) ABSTRACT

Provided are: a thermally curable composition which contains benzoxazine-based compounds obtained by condensing aromatic diamines, a phenol compound, and an aldehyde compound, the aromatic diamines being a mixture comprising 4,4'-oxydianiline and 3,4'-oxydianiline, the mass ratio of the 4,4'-oxydianiline to the 3,4'-oxydianiline being 50:50 to 80:20; a varnish of the thermally curable composition; and a thermally cured object.

16 Claims, 1 Drawing Sheet

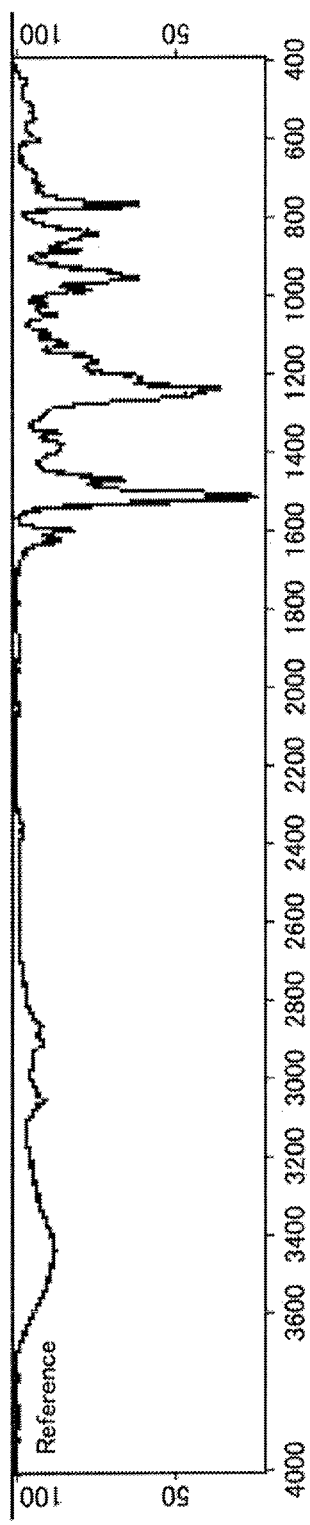
Figure

THERMALLY CURABLE COMPOSITION, VARNISH THEREOF, AND THERMALLY CURED OBJECT

CROSS REFERENCE TO RELATED APPLICATIONS

This is the U.S. National Phase application of PCT/JP2017/022681, filed Jun. 20, 2017, which claims priority to Japanese Patent Application No. 2016-146071, filed Jul. 26, 2016, the disclosures of each of these applications being incorporated herein by reference in their entireties for all purposes.

FIELD OF THE INVENTION

The present invention relates to a thermosetting composition, a varnish thereof, and a thermosetting material thereof.

BACKGROUND OF THE INVENTION

Benzoxazine compounds are cured when heated without generating volatile by-products. In addition, benzoxazine compounds exhibit excellent properties such as heat resistance, flame retardance and electrical characteristics and thus are used in a wide variety of applications including laminated sheets, adhesives, electronic materials such as sealants, and complexes with carbon fibers, namely, prepregs. Further, benzoxazine compounds attract attention as alternative shaping materials to replace phenolic resins and epoxy resins.

The benzoxazine compounds may be easily synthesized from a phenol, an amine and an aqueous paraformaldehyde or formaldehyde solution as materials, and a number of syntheses have been reported (for example, Patent Literatures 1 to 3).

PATENT LITERATURES

Patent Literature 1: JP 60-155234 A
Patent Literature 2: JP 60-177074 A
Patent Literature 3: JP 49-047378 A

SUMMARY OF THE INVENTION

However, a thermosetting composition containing the benzoxazine compounds with excellent heat resistance has a problem in that because of its high crystallinity, the composition is poor in solubility with respect to low-boiling point solvents and is precipitated during a long storage at a low temperature.

Accordingly, there has been a demand for a thermosetting composition which exhibits excellent solvent solubility and cold-temperature stability, a varnish thereof and a thermosetting material thereof.

The present invention therefore aims at providing a thermosetting composition which exhibits excellent solvent solubility and cold-temperature stability, a varnish thereof and a thermosetting material thereof.

The inventor of the present invention has made an intensive study to solve the foregoing problem and as a result discovered that a thermosetting composition containing a benzoxazine compound that is obtained by mixing 4,4'-oxydianiline and 3,4'-oxydianiline at a specific ratio and condensing the resulting mixture with phenols and aldehydes exhibits excellent solvent solubility and cold-temperature stability. According to the discovery, the inventor has completed the present invention.

Specifically, the present invention, according to exemplary embodiments, provides the following [1] to [6].

[1] A thermosetting composition comprising a benzoxazine compound that is obtained by condensing aromatic diamine, phenols and aldehydes,
wherein the aromatic diamine is a mixture comprising 4,4'-oxydianiline and 3,4'-oxydianiline, and a mass ratio between the 4,4'-oxydianiline and the 3,4'-oxydianiline is 50:50 to 80:20.

[2] The thermosetting composition according to [1] above, wherein the mass ratio between the 4,4'-oxydianiline and the 3,4'-oxydianiline is 60:40 to 70:30.

[3] A thermosetting composition comprising a benzoxazine compound, the composition being obtained by mixing: a thermosetting composition (A) containing a benzoxazine compound that is obtained by condensing 4,4'-oxydianiline, phenols and aldehydes; and a thermosetting composition (B) containing a benzoxazine compound that is obtained by condensing 3,4'-oxydianiline, phenols and aldehyde,
wherein a mass ratio between the thermosetting composition (A) and the thermosetting composition (B) is 50:50 to 80:20.

[4] The thermosetting composition according to [3] above, wherein the mass ratio between the thermosetting composition (A) and the thermosetting composition (B) is 60:40 to 70:30.

[5] A varnish comprising the thermosetting composition according to any one of [1] to [4] above and an organic solvent that dissolves the thermosetting composition.

[6] A thermosetting material that is obtained by thermally curing the thermosetting composition according to any one of [1] to [4] above.

According to the present invention, it is possible to provide a thermosetting composition which exhibits excellent solvent solubility and cold-temperature stability, as well as a varnish thereof and a thermosetting material thereof.

The thermosetting composition, the varnish thereof and the thermosetting material thereof according to the present invention can be used in laminated sheets, adhesives, or electronic materials such as sealants.

BRIEF DESCRIPTION OF DRAWINGS

The FIGURE is an IR spectral chart of a thermosetting composition 1 produced in Example 1.

DETAILED DESCRIPTION OF EMBODIMENTS OF THE INVENTION

Below described in detail are a thermosetting composition, a varnish thereof, and a thermosetting material thereof according to embodiments of the present invention.

In the description, a range expressed using the form of "(numeral) to (another numeral)" should read as a range including both ends defined by the numerals. For example, the expression of "A to B" refers to a range including A and B. In addition, a range expressed using the form of "(numeral) or higher" or "(numeral) or lower" should read as a range including the numeral accompanied by the expression of "or higher" or "or lower." For example, the expression of "C or higher" refers to a range including and exceeding C, while the expression of "D or lower" refers to a range including and falling below D.

[Thermosetting Composition]

A thermosetting composition according to an embodiment of the present invention is a thermosetting composition containing a benzoxazine compound that is obtained by condensing an aromatic diamine mixture comprising 4,4'-oxydianiline and 3,4'-oxydianiline at a mass ratio of 50:50 to 80:20, phenols and aldehydes.

<Production Method of Thermosetting Composition>

The thermosetting composition of the present invention can be produced by a known method of producing a benzoxazine compound using an aromatic diamine mixture comprising 4,4'-oxydianiline and 3,4'-oxydianiline at a mass ratio of 50:50 to 80:20, phenols and aldehydes.

<Aromatic Diamine Mixture>

In the aromatic diamine mixture, the mass ratio between 4,4'-oxydianiline and 3,4'-oxydianiline is not particularly limited as long as the mass ratio falls within the range of 50:50 to 80:20, and the mass ratio is preferably 55:45 to 75:25 and more preferably 60:40 to 70:30.

<Phenols>

The phenols may be monohydric or polyhydric.

Examples of monohydric phenols include phenol, methylphenol, dimethylphenol, tert-butylphenol, di-tert-butylphenol and naphthol.

Examples of polyhydric phenols include bisphenol.

Particular examples of the bisphenol include bisphenol A, bisphenol F and bisphenol S.

Such phenols may be compounds of monohydric phenol or polyhydric phenol having an alkyl group, an alkoxy group, a halogen or an aromatic hydrocarbon group as a substituent.

Among these, from the standpoint of the inexpensive cost, at least one selected from the group consisting of phenol, methylphenol, dimethylphenol, tert-butylphenol and di-tert-butylphenol is preferable, at least one selected from the group consisting of phenol, 3-methylphenol, 4-methylphenol, 3,4-dimethylphenol and 4-tert-butylphenol is preferable, and phenol is particularly preferable.

The amount of phenols used is not particularly limited and is preferably 1.0 to 5.0 mol, more preferably 1.5 mol to 3.0 mol, even more preferably 1.9 to 2.1 mol, and particularly preferably 2.0 mol, with respect to 1.0 mol of aromatic diamine.

<Aldehydes>

The aldehydes are not particularly limited and are preferably formaldehydes.

Examples of formaldehydes include formaldehyde, 1,3,5-trioxane and paraformaldehyde. Since formaldehyde is gaseous at normal temperature and normal pressure, it is preferable to use formaldehyde in the form of an aqueous solution.

The amount of aldehydes used is not particularly limited and is preferably, when converted to the amount of formaldehyde, 3.5 to 5.5 mol and more preferably 3.8 to 4.2 mol, with respect to 1.0 mol of aromatic diamine.

The molar ratio of aromatic diamine, phenols and aldehydes during the condensation reaction is particularly preferably 1:2:4 to 4.1 (when the amount of aldehydes is converted to that of formaldehydes).

<Reaction Conditions>

The reaction normally takes place in the presence of a solvent. The solvent may be kept refluxing during the reaction.

Examples of the solvent include alcohol solvents such as methanol, ethanol, isopropyl alcohol, n-butyl alcohol, n-hexyl alcohol and cyclohexyl alcohol; ether solvents such as tetrahydrofuran, dioxane and dimethoxyethane; aliphatic hydrocarbon solvents such as toluene, xylene and benzene; aprotic polar solvents such as N,N-dimethyl formamide, N,N-dimethyl acetamide, N-methyl pyrrolidinone and dimethyl sulfoxide; nitrile solvents such as acetonitrile and benzonitrile; halogenated hydrocarbon solvents such as dichloromethane, chloroform, 1,2-dichloroethane, carbon tetrachloride and chlorobenzene; and water.

As the solvent, two or more kinds of solvents may be mixed and used.

The reaction may take place under the normal pressure condition, pressurized condition or depressurized condition. The reaction may also take place in an inert gas atmosphere with nitrogen gas, argon gas or the like.

The reaction temperature is normally 80° C. to 120° C. and preferably 90° C. to 110° C.

The reaction can be tracked through measurement by the gel permeation chromatography (GPC) or the like. It is preferable to allow the reaction to proceed until increase of a benzoxazine compound or decrease of phenols is no longer observed. A normal reaction time is one hour to 100 hours.

Following the completion of the reaction, the resulting reaction mass is concentrated and/or filtered, whereby the thermosetting composition containing a benzoxazine compound of the present invention can be obtained.

<Benzoxazine Compound Contained in Thermosetting Composition According to an Embodiment of the Present Invention>

A benzoxazine compound that is obtained by condensing an aromatic diamine mixture comprising 4,4'-oxydianiline and 3,4'-oxydianiline at a mass ratio of 50:50 to 80:20, phenols and aldehydes normally contains 35 to 50% by mass of a monomeric benzoxazine compound and the balance of an oligomer with the oxazine ring being opened.

Accordingly, the benzoxazine compound can be identified only by its production method.

In a preferable embodiment, phenol, 3-methyl phenol, 4-methyl phenol, 3,4-dimethyl phenol or 4-tert-butyl phenol is used as the phenols, while formaldehyde, 1,3,5-trioxane or paraformaldehyde is used as the aldehydes, and as a result a monomer expressed by the following formula is obtained.

[Chemical Formula 1]

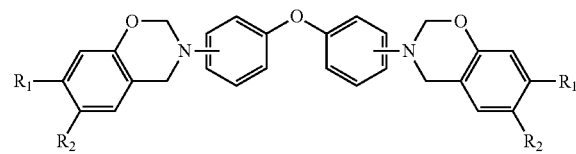

In the formula, a benzoxazine ring is substituted at the 3,4' position or the 4,4' position in diphenylether, while $R_1$ is a hydrogen atom or a methyl group, and $R_2$ is a hydrogen atom, a methyl group or a tert-butyl group.

<Another Production Method of Thermosetting Composition According to an Embodiment of the Present Invention>

The thermosetting composition containing a benzoxazine compound of the present invention can be also produced by mixing a thermosetting composition (A) containing a benzoxazine compound that is obtained by condensing 4,4'-oxydianiline, phenols and aldehydes, and a thermosetting composition (B) containing a benzoxazine compound that is obtained by condensing 3,4'-oxydianiline, phenols and aldehydes at a mass ratio of 50:50 to 80:20.

The thermosetting composition (A) and the thermosetting composition (B) can be each produced by the foregoing "Production Method of Thermosetting Composition." In this case, as aromatic diamine, 4,4'-oxydianiline (when producing the thermosetting composition (A)) or 3,4'-oxydianiline (when producing the thermosetting composition (B)) is used, in place of a mixture thereof.

The mass ratio between the thermosetting composition (A) and the thermosetting composition (B) is not particularly limited as long as it falls within the range of 50:50 to 80:20, and is preferably 55:45 to 75:25 and more preferably 60:40 to 70:30.

<Other Components of Thermosetting Composition in Accordance with an Embodiment of the Present Invention can Contain>

The thermosetting composition of the present invention may further contain a curing accelerator.

The curing accelerator is not particularly limited, and examples thereof include imidazoles and a novolac resin. Specific examples of the imidazoles include 1-methylimidazole, 2-methylimidazole, 1,2-dimethylimidazole and 2-phenylimidazole. Specific examples of the novolac resin include a random phenolic resin having a weight average molecular weight of at least 1,000.

<Solvent Solubility of Thermosetting Composition of Present Invention in Low-Boiling Point Solvent>

Solvent solubility of the thermosetting composition of the present invention in a low-boiling point solvent is preferably measured by a measurement method of physical properties to be described later. It is desirable that the solubility be 50% or higher and more preferably 60% or higher in acetone (boiling point: 56.5° C.) or methyl ethyl ketone (boiling point: 79.5° C.)

In the present invention, the low-boiling point solvent refers to an organic solvent having a boiling point of 150° C. or lower at normal pressure.

[Varnish]

A varnish according to an embodiment of the present invention is obtained by dissolving the thermosetting composition according to an embodiment of the present invention in an organic solvent. In other words, the varnish contains the thermosetting composition according to an embodiment of the present invention and an organic solvent that dissolves the thermosetting composition.

The organic solvent is not particularly limited as long as it dissolves the above-described compound, and specific examples thereof include non-polar solvents such as toluene and xylene, aprotic polar solvents such as N-methyl-2-pyrolidone (NMP) and N,N-dimethylacetamide (DMAc), alcohols and alkyl acetates.

In the description of the present application, the organic solvent may be sometimes referred to as "organic solvent" or merely "solvent."

The varnish of the present invention may further contain a curing accelerator.

The curing accelerator is not particularly limited, and examples thereof include imidazoles and a novolac resin. Specific examples of the imidazoles include 1-methylimidazole, 2-methylimidazole, 1,2-dimethylimidazole and 2-phenylimidazole. Specific examples of the novolac resin include a random phenolic resin having a weight average molecular weight of at least 1,000.

The cold-temperature stability of the varnish of the present invention is preferably determined by a measurement method of the physical properties to be described later, and it is desirable that the varnish be free from visible precipitate (determination: absent) after storage of two or more weeks at 5° C. or lower.

[Thermosetting Material].

A thermosetting material according to an embodiment of the present invention is obtained by thermally curing the thermosetting composition according to an embodiment of the present invention.

Thermal curing conditions are not particularly limited and may be appropriately set to be, for example, heating at 250° C. for 3 hours, or 220° C. for 5 hours in accordance with the type of thermosetting composition.

The glass transition temperature (Tg) of the thermosetting material of the present invention is preferably measured by a measurement method of the physical properties to be described later. It is desirable that the glass transition temperature be 175° C. or higher and less than 250° C.

The 5% weight loss temperature (Td5%) of the thermosetting material of the present invention is preferably measured by a measurement method of the physical properties to be described later. It is desirable that the 5% weight loss temperature be 375° C. or higher and 450° C. or lower.

[Measurement Method of Physical Properties]

In the present invention, the weight average molecular weight (Mw), the purity (monomer purity) and the solvent solubility of the thermosetting composition, the cold-temperature stability of the varnish, and the glass transition temperature and the 5% weight loss temperature (Td5%) of the thermosetting material are preferably measured or determined according to the following methods.

<Weight Average Molecular Weight (Mw), Purity (Monomer Purity)>

Through the standard polystyrene conversion, the weight average molecular weight (Mw) in terms of the polystyrene-converted value was measured by gel permeation chromatography (GPC).

The following GPC conditions were adopted.

High performance liquid chromatograph system, maker: Waters

Analysis software: Millennium

Liquid feeding unit: PU515

Degasser: TG-14

Differential refractive detector: 2414

Column heater: U-620VP#50

Column: Shodex 801, 802, 802.5, 803 connected in series

Column temperature: 40° C.

Flow rate: 1 mL/min.

Eluent: THF (tetrahydrofuran, available from Wako Pure Chemical Corporation; stabilizer-free; for HPLC)

Sample: 0.7% by mass

The calibration curve was generated using the standard polystyrene having Mw (Mw/Mn) values of 37,200 (1.01), 17,100 (1.02), 9,830 (1.02), 5,870 (1.05), 2,500 (1.05), 1,050 (1.13), 500 (1.14) and 300 (1.20).

The purity (monomer purity) was measured as the combined total of the peaks of a monomer. (unit: % by mass)

<Solvent Solubility>

The thermosetting composition is gradually dissolved in acetone, and the solubility is determined by the point where dissolution ceases (unit: %). Solubility of 60% or higher is acceptable.

<Cold-Temperature Stability>

An acetone solution containing 60% by mass of the thermosetting composition in terms of solid content is prepared and stored in a refrigerator at 5° C. or lower for about one month. Presence or absence of visible precipitates in the solution is determined (determination: Present/Absent). A solution in which precipitates are "Absent" is acceptable.

<Tg (Glass Transition Temperature)>

The thermosetting composition is heated at 250° C. for 3 hours to be thermally cured, whereby the thermosetting material is prepared.

With use of a differential scanning calorimeter (DSC), this thermosetting material is heated in a nitrogen atmosphere at a temperature increase rate of 20° C./min., and the glass transition temperature is determined based on the temperature at which the change of specific heat is observed (unit: ° C.). A glass transition temperature of 175° C. or higher is acceptable.

<Td5% (5% Weight Loss Temperature)>

With use of a thermal analysis instrument (DTG-60 manufactured by Shimadzu Corporation), the thermosetting material is heated in an air atmosphere at a temperature increase rate of 10° C./min., and the temperature at which a 5% weight loss is reached is obtained as the 5% weight loss temperature (unit: ° C.). The Td5% is an indicator of heat resistance; the higher the temperature is, the higher the heat resistance is. A temperature of 375° C. or higher is acceptable.

EXAMPLES

The present invention is specifically described below in reference to Examples, to which the present invention is in no way limited.

Example 1

In a one-liter reaction vessel having a stirrer, a thermometer, a reflux device, an inert gas introduction pipe and an oil bath, 105 g of a mixture composed of 4,4'-oxydianiline and 3,4'-oxydianiline at a mass ratio of 65:35, 99 g of phenol, 69 g of 92% paraformaldehyde, and 500 g of toluene were placed, and subjected to condensation reaction while being dehydrated at 90° C. Subsequently, the resultant was heated to 110° C., toluene was distilled away therefrom, and thereafter the residual toluene and unreacted substances were removed through reduced-pressure distillation at 125° C. As a result, 220 g of thermosetting composition containing a benzoxazine compound (hereinafter, referred to as "thermosetting composition 1") was obtained.

The thermosetting composition 1 thus obtained was dissolved in acetone, whereby an acetone solution containing 60% by mass of the thermosetting composition in terms of solid content was prepared as a varnish.

In addition, the thermosetting composition 1 was heated at 250° C. for 3 hours to be thermally cured, whereby a thermosetting material was obtained.

The IR (infrared absorption) spectral chart of the thermosetting composition 1 is shown in the FIGURE.

Moreover, the molecular weight of this thermosetting composition was measured by GPC, and the result was that the weight average molecular weight (Mw) was 1,250, while the monomer purity (purity) was 43% by mass.

Furthermore, Table 1 shows the cold-temperature stability of the varnish, as well as the glass transition temperature (Tg) and the 5% weight loss temperature (Td5%) of the thermosetting material measured by the above-described measurement methods.

Example 2

In the similar manner to that of Example 1 except that a mixture composed of 4,4'-oxydianiline and 3,4'-oxydianiline at a mass ratio of 80:20 was used as the aromatic diamine, a thermosetting composition containing a benzoxazine compound (hereinafter, referred to as "thermosetting composition 2"), a varnish thereof and a thermosetting material thereof were obtained.

The molecular weight of the thermosetting composition 2 was measured by GPC, and the result was that the weight average molecular weight (Mw) was 1,100, while the monomer purity (purity) was 47% by mass.

In addition, Table 1 shows the cold-temperature stability of the varnish, as well as the glass transition temperature (Tg) and the 5% weight loss temperature (Td5%) of the thermosetting material measured by the above-described measurement methods.

Example 3

In the similar manner to that of Example 1 except that a mixture composed of 4,4'-oxydianiline and 3,4'-oxydianiline at a mass ratio of 50:50 was used as the aromatic diamine, a thermosetting composition containing a benzoxazine compound (hereinafter, referred to as "thermosetting composition 3"), a varnish thereof and a thermosetting material thereof were obtained.

The molecular weight of the thermosetting composition 3 was measured by GPC, and the result was that the weight average molecular weight (Mw) was 1,300, while the monomer purity (purity) was 35% by mass.

In addition, Table 1 shows the cold-temperature stability of the varnish, as well as the glass transition temperature (Tg) and the 5% weight loss temperature (Td5%) of the thermosetting material measured by the above-described measurement methods.

Example 4

Similarly to Example 1, 4,4'-oxydianiline, phenol and 92% paraformaldehyde with a molar ratio of 1:2:4.1 (where the molar number of paraformaledhyde is a formaldehyde-converted molar number) were subjected to condensation reaction in toluene. After toluene was distilled away, a thermosetting composition containing a benzoxazine compound (hereinafter, referred to as "thermosetting composition A") was obtained.

Next, similarly to Example 1, 3,4'-oxydianiline, phenol and 92% paraformaldehyde with a molar ratio of 1:2:4.1 (where the molar number of paraformaledhyde is a formaldehyde-converted molar number) were subjected to condensation reaction in toluene. After toluene was distilled away, a thermosetting composition containing a benzoxazine compound (hereinafter, referred to as "thermosetting composition B") was obtained.

The thermosetting composition A and the thermosetting composition B were physically blended at a mass ratio of 65:35, whereby a thermosetting composition containing a benzoxazine compound (hereinafter, referred to as "thermosetting composition C") was obtained.

The resulting thermosetting composition C was dissolved in acetone, whereby an acetone solution containing 60% by mass of the thermosetting composition in terms of solid content was prepared as a varnish.

In addition, the thermosetting composition C was heated at 250° C. for 3 hours to be thermally cured, whereby a thermosetting material was obtained.

Table 1 shows the cold-temperature stability of the varnish, as well as the glass transition temperature (Tg) and the 5% weight loss temperature (Td5%) of the thermosetting material measured by the above-described measurement methods.

Comparative Example 1

In the similar manner to that of Example 1 except that a mixture composed of 4,4'-oxydianiline and 3,4'-oxydianiline at a mass ratio of 90:10 was used as the aromatic diamine, a thermosetting composition containing a benzoxazine compound (hereinafter, referred to as "thermosetting composition X"), a varnish thereof and a thermosetting material thereof were obtained.

The molecular weight of the thermosetting composition X was measured by GPC, and the result was that the weight average molecular weight (Mw) was 1,100, while the monomer purity (purity) was 49% by mass.

In addition, Table 1 shows the cold-temperature stability of the varnish, as well as the glass transition temperature (Tg) and the 5% weight loss temperature (Td5%) of the thermosetting material measured by the above-described measurement methods.

Comparative Example 2

In the similar manner to that of Example 1 except that a mixture composed of 4,4'-oxydianiline and 3,4'-oxydianiline at a mass ratio of 40:60 was used as the aromatic diamine, a thermosetting composition containing a benzoxazine compound (hereinafter, referred to as "thermosetting composition Y"), a varnish thereof and a thermosetting material thereof were obtained.

The molecular weight of the thermosetting composition Y was measured by GPC, and the result was that the weight average molecular weight (Mw) was 1,460, while the monomer purity (purity) was 24% by mass.

In addition, Table 1 shows the cold-temperature stability of the varnish, as well as the glass transition temperature (Tg) and the 5% weight loss temperature (Td5%) of the thermosetting material measured by the above-described measurement methods.

(Td5%; an indicator of heat resistance) of the thermosetting materials.

Comparative Examples 1 to 2

The thermosetting compositions having a benzoxazine structure in Comparative Examples 1 to 2 showed unacceptable cold-temperature stability and failed to satisfy the required performances.

INDUSTRIAL APPLICABILITY

The thermosetting composition containing a benzoxazine composition according to an embodiment of the present invention exhibits excellent solvent solubility and cold-temperature stability and therefore is suitable for use in sealants, laminated sheets, adhesives, paints, coating materials, FRPs, shaping materials and others; the thermosetting composition is expected to be applied in advanced technological fields.

The invention claimed is:

1. A thermosetting composition comprising a benzoxazine compound that is obtained by condensing aromatic diamine, phenols and aldehydes,
   wherein the aromatic diamine is a mixture comprising 4,4'-oxydianiline and 3,4'-oxydianiline, and a mass ratio between the 4,4'-oxydianiline and the 3,4'-oxydianiline is in the range of 50:50 to 80:20.

2. The thermosetting composition according to claim 1, wherein the mass ratio between the 4,4'-oxydianiline and the 3,4'-oxydianiline is in the range of 60:40 to 70:30.

3. A thermosetting composition comprising a benzoxazine compound, the composition being obtained by mixing: a thermosetting composition (A) containing a benzoxazine compound that is obtained by condensing 4,4'-oxydianiline, phenols and aldehydes; and a thermosetting composition (B) containing a benzoxazine compound that is obtained by condensing 3,4'-oxydianiline, phenols and aldehyde,

TABLE 1

|  | | Thermosetting compsition | | | Varnish | Thermosetting material | |
| --- | --- | --- | --- | --- | --- | --- | --- |
|  | Raw materials Mixing ratio*[1] | Mw | Purity [% by mass] | Solvent solubility (60% or higher) | Cold-temperature stability (5° C. or lower) | Tg [° C.] | Td5% [° C.] |
| Example 1 | 65:35 | 1250 | 43 | Acceptable | Acceptable | 182 | 395 |
| Example 2 | 80:20 | 1100 | 47 | Acceptable | Acceptable | 179 | 396 |
| Example 3 | 50:50 | 1300 | 35 | Acceptable | Acceptable | 176 | 393 |
| Example 4 | 65:35*[2] | — | — | Acceptable | Acceptable | 181 | 396 |
| Com. Ex. 1 | 90:10 | 1100 | 49 | Acceptable | Unacceptable | 180 | 401 |
| Com. Ex. 2 | 40:60 | 1460 | 24 | Acceptable | Unacceptable | 175 | 395 |

*[1]Mixing ratio refers to a mass ratio between 4,4'-oxydianiline and 3,4'-oxydianiline used as raw materials. (Mixing ratio = mass of 4,4'-oxydianiline: mass of 3,4'-oxydianiline)
*[2]In Example 4, the thermosetting composition (A) and the thermosetting composition (B) were mixed at a mass ratio of 65:35.

[Discussion of Result]

Examples 1 to 4

Acceptable results were seen and the required performances were satisfied in all of the solvent solubility of the thermosetting compositions containing a benzoxazine compound in a low-boiling point solvent (acetone), the cold-temperature stability of the varnishes, and the glass transition temperature (Tg) and the 5% weight loss temperature wherein a mass ratio between the thermosetting composition (A) and the thermosetting composition (B) is in the range of 50:50 to 80:20.

4. The thermosetting composition according to claim 3, wherein the mass ratio between the thermosetting composition (A) and the thermosetting composition (B) is in the range of 60:40 to 70:30.

5. A varnish comprising the thermosetting composition according to claim 1 and an organic solvent that dissolves the thermosetting composition.

6. A thermosetting material that is obtained by thermally curing the thermosetting composition according to claim 1.

7. A varnish comprising the thermosetting composition according to claim 2 and an organic solvent that dissolves the thermosetting composition.

8. A thermosetting material that is obtained by thermally curing the thermosetting composition according to claim 2.

9. A varnish comprising the thermosetting composition according to claim 3 and an organic solvent that dissolves the thermosetting composition.

10. A thermosetting material that is obtained by thermally curing the thermosetting composition according to claim 3.

11. A varnish comprising the thermosetting composition according to claim 4 and an organic solvent that dissolves the thermosetting composition.

12. A thermosetting material that is obtained by thermally curing the thermosetting composition according to claim 4.

13. The thermosetting composition according to claim 1, wherein an acetone solution containing 60% by mass of the thermosetting composition in terms of solid content is free from visible precipitate after storage at 5° C. or lower for about one month.

14. The thermosetting composition according to claim 3, wherein an acetone solution containing 60% by mass of the thermosetting composition in terms of solid content is free from visible precipitate after storage at 5° C. or lower for about one month.

15. The varnish according to claim 5, wherein the varnish is free from visible precipitate after storage at 5° C. or lower for two or more weeks.

16. The varnish according to claim 9, wherein the varnish is free from visible precipitate after storage at 5° C. or lower for two or more weeks.

\* \* \* \* \*